(12) United States Patent
Sarrach et al.

(10) Patent No.: US 11,714,327 B2
(45) Date of Patent: Aug. 1, 2023

(54) NON-LIGHT-EMITTING VARIABLE TRANSMISSION DEVICE AND A METHOD OF FORMING THE SAME

(71) Applicant: SAGE ELECTROCHROMICS, INC., Faribault, MN (US)

(72) Inventors: Sebastian Marius Sarrach, Lakeville, MN (US); Jean-Christophe Giron, Edina, MN (US); Pascal Reutler, Paris (FR); Sean Murphy, Westborough, MA (US); Peter Bocek, Northfield, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 109 days.

(21) Appl. No.: 16/124,744

(22) Filed: Sep. 7, 2018

(65) Prior Publication Data

US 2019/0079365 A1  Mar. 14, 2019

Related U.S. Application Data

(60) Provisional application No. 62/557,556, filed on Sep. 12, 2017.

(51) Int. Cl.
*G02F 1/153* (2006.01)
*G02F 1/155* (2006.01)
*G02F 1/1523* (2019.01)

(52) U.S. Cl.
CPC ............ *G02F 1/1533* (2013.01); *G02F 1/155* (2013.01); *G02F 1/1523* (2013.01)

(58) Field of Classification Search
CPC ........ G02F 1/15; G02F 1/1502; G02F 1/1523; G02F 1/153; G02F 1/1533; G02F 1/155;

(Continued)

(56) References Cited

U.S. PATENT DOCUMENTS 5,185,182 A   2/1993  Brown
5,668,663 A   9/1997  Varaprasad et al.
(Continued)

FOREIGN PATENT DOCUMENTS

CN   102057323 A   5/2011
CN   202953940 U   5/2013
(Continued)

OTHER PUBLICATIONS

Standard Test Methods for Assessing the Adhesion of Metallic and Inorganic Coatings by the Mechanized Tape Test, 2010, 6 pgs, ASTM International, West Conshohocken, US.

(Continued)

*Primary Examiner* — Marin Pichler
(74) *Attorney, Agent, or Firm* — Abel Schillinger, LLP; Robert N Young (57) ABSTRACT

A non-light-emitting variable transmission device can include an active stack; a transparent conductive layer overlying the active stack; an antireflective layer overlying the transparent conductive layer and defining a hole; and a bus bar comprising a conductive tape that extends into the hole and contacts the transparent conductive layer. Proper selection of materials and design of a bus bar can allow an electrical connection to be made to the transparent conductive layer without the need to cut an underlying transparent conductive layer. A method of forming the non-light-emitting variable transmission device can include patterning the antireflective layer to define the hole that extends to the transparent conductive layer. Improved control in patterning allows the antireflective layer to be relatively thin and not remove too much of the underlying transparent conductive layer.

13 Claims, 6 Drawing Sheets

(58) Field of Classification Search
CPC ..... G02F 2001/1536; G02F 2001/1552; G02F 2001/1557
USPC ........ 359/265, 267, 268, 269, 271, 274, 275
See application file for complete search history.

(56) References Cited

U.S. PATENT DOCUMENTS

| | | |
|---|---|---|
| 5,724,175 A | 3/1998 | Hichwa et al. |
| 5,995,271 A | 11/1999 | Zieba et al. |
| 6,094,292 A | 7/2000 | Goldner et al. |
| 6,118,573 A | 9/2000 | Kubo et al. |
| 6,373,618 B1 | 4/2002 | Agrawal et al. |
| 6,472,636 B1 | 10/2002 | Baldwin |
| 6,492,619 B1 | 12/2002 | Sol |
| 6,625,875 B2 | 9/2003 | Sol |
| 7,372,610 B2 | 5/2008 | Burdis et al. |
| 7,679,810 B2 | 3/2010 | Fuss et al. |
| 8,094,247 B2 | 1/2012 | Allemand et al. |
| 8,213,074 B1 | 7/2012 | Shrivastava et al. |
| 8,585,885 B2 | 11/2013 | Brese et al. |
| 8,760,749 B2 | 6/2014 | Melcher et al. |
| 9,090,211 B2 | 7/2015 | McCabe et al. |
| 9,158,172 B2 | 10/2015 | Sbar et al. |
| 9,228,092 B2 | 1/2016 | Brese et al. |
| 9,341,914 B2 | 5/2016 | McCabe et al. |
| 9,878,670 B2 | 1/2018 | McCabe et al. |
| 10,222,674 B2 | 3/2019 | Brossard |
| 10,283,815 B2 | 5/2019 | Kojima |
| 2002/0024544 A1 | 2/2002 | Codos |
| 2002/0075552 A1 | 6/2002 | Poll et al. |
| 2002/0135881 A1 | 9/2002 | Rukavina et al. |
| 2003/0129416 A1 | 7/2003 | Patz et al. |
| 2004/0061920 A1 | 4/2004 | Tonar et al. |
| 2004/0175580 A1 | 9/2004 | Schaepkens |
| 2005/0195488 A1 | 9/2005 | McCabe et al. |
| 2006/0283084 A1 | 12/2006 | Johnson |
| 2007/0133078 A1 | 6/2007 | Fanton et al. |
| 2008/0169185 A1 | 7/2008 | Burdis et al. |
| 2008/0239644 A1 | 10/2008 | Cassidy et al. |
| 2009/0181203 A1 | 7/2009 | Valentin et al. |
| 2009/0197077 A1 | 8/2009 | Reutler et al. |
| 2009/0303565 A1* | 12/2009 | Karmhag ............. G02F 1/1533 359/265 |
| 2009/0304912 A1 | 12/2009 | Kwak et al. |
| 2010/0067090 A1 | 3/2010 | Egerton et al. |
| 2010/0245973 A1 | 9/2010 | Wang et al. |
| 2011/0048614 A1 | 3/2011 | Veerasamy |
| 2011/0051221 A1 | 3/2011 | Veerasamy |
| 2011/0059275 A1 | 3/2011 | Stark |
| 2011/0080629 A1 | 4/2011 | Neuman et al. |
| 2011/0211246 A1 | 9/2011 | Agrawal et al. |
| 2012/0026573 A1 | 2/2012 | Collins et al. |
| 2012/0147449 A1 | 6/2012 | Bhatnagar et al. |
| 2012/0182593 A1 | 7/2012 | Collins et al. |
| 2012/0218620 A1 | 8/2012 | Kwak et al. |
| 2012/0300280 A1 | 11/2012 | Murphy et al. |
| 2013/0271812 A1 | 10/2013 | Brown et al. |
| 2013/0273377 A1 | 10/2013 | Veerasamy |
| 2013/0278988 A1 | 10/2013 | Jack et al. |
| 2013/0286458 A1 | 10/2013 | Lamine et al. |
| 2013/0288423 A1 | 10/2013 | Takahama |
| 2014/0022621 A1 | 1/2014 | Kailasam et al. |
| 2014/0043667 A1 | 2/2014 | Bergh et al. |
| 2014/0054578 A1 | 2/2014 | Thoumazet et al. |
| 2014/0133005 A1 | 5/2014 | Sbar et al. |
| 2014/0166730 A1 | 6/2014 | Faylor et al. |
| 2014/0182125 A1 | 7/2014 | Rozbicki et al. |
| 2014/0338735 A1 | 11/2014 | Allemand et al. |
| 2015/0072084 A1 | 3/2015 | Mimoun et al. |
| 2015/0177583 A1 | 6/2015 | Ding et al. |
| 2015/0362816 A1 | 12/2015 | Strong et al. |
| 2016/0026055 A1 | 1/2016 | Choi et al. |
| 2016/0229741 A1 | 8/2016 | Canova et al. |
| 2016/0377948 A1 | 12/2016 | Rozbicki et al. |
| 2017/0130523 A1 | 5/2017 | Shrivastava et al. |
| 2017/0299934 A1 | 10/2017 | Brossard |
| 2017/0322473 A1 | 11/2017 | Brossard et al. |
| 2017/0371218 A1 | 12/2017 | Kailasam et al. |
| 2019/0155121 A1 | 5/2019 | Brossard |

FOREIGN PATENT DOCUMENTS

| | | |
|---|---|---|
| CN | 103771724 A | 5/2014 |
| CN | 106662788 A | 5/2017 |
| EP | 0602175 B1 | 9/1992 |
| EP | 2583135 B1 | 6/2011 |
| EP | 2593832 B1 | 5/2013 |
| JP | S59216178 A | 12/1984 |
| JP | H03257829 A | 11/1991 |
| JP | 2001085715 A | 3/2001 |
| JP | 2014516455 A | 7/2014 |
| JP | 2014519622 A | 8/2014 |
| JP | 2014529108 A | 10/2014 |
| JP | 2016213070 A | 12/2016 |
| JP | 2017522592 A | 8/2017 |
| KR | 20170100568 A | 9/2017 |
| TW | 201626082 A | 7/2016 |
| WO | 1993005438 A1 | 3/1993 |
| WO | 2008013501 A1 | 1/2008 |
| WO | 2011161110 A1 | 12/2011 |
| WO | 2012162502 A1 | 11/2012 |
| WO | 2012177790 A2 | 12/2012 |
| WO | 2013055457 A1 | 4/2013 |
| WO | 2013090209 A1 | 6/2013 |
| WO | 2013156721 A1 | 10/2013 |
| WO | 2014078555 A1 | 5/2014 |
| WO | 2015055944 A1 | 4/2015 |
| WO | 2015195715 A1 | 12/2015 |
| WO | 2016100403 A1 | 6/2016 |
| WO | 2017184430 A1 | 10/2017 |

OTHER PUBLICATIONS

Chaput, Christophe, "Fabrication of ceramics by stereolithography," Lizenznehmer Rtejoumal—Forum fr Rapid Technologie, 2007, 16 pgs, vol. 4, FR.

International Search Report and Written Opinion for PCT/US2017/027443 dated Sep. 12, 2017, 15 pages.

International Search Report and Written Opinion for PCT/US2016/039346, dated Jul. 31, 2012, 12 pages.

"EL-90038—Highly Conductive Bus Bar Tape for Photovoltaic Applications/EMI Shielding Tape," Adhesives Research, 2013, 4 pgs, US.

International Search Report and Written Opinion for PCT/US2018/049926, dated Dec. 19, 2018, 14 pages.

Non-Final Office Action for U.S. Appl. No. 13/479,781, dated Nov. 20, 2014, 12 pages.

International Search Report and Written Opinion for Application No. PCT/US2013/070129 dated Feb. 21, 2014, 11 pages.

Non-Final Office Action for U.S. Appl. No. 13/798,520, dated Oct. 24, 2014, 20 pages.

* cited by examiner

NON-LIGHT-EMITTING VARIABLE TRANSMISSION DEVICE AND A METHOD OF FORMING THE SAME

CROSS-REFERENCE TO RELATED APPLICATION

This application claims priority under 35 U.S.C. § 119(e) to U.S. Provisional Application No. 62/557,556, entitled "NON-LIGHT-EMITTING VARIABLE TRANSMISSION DEVICE AND A METHOD OF FORMING THE SAME," by Sebastian Marius Sarrach et al., filed Sep. 12, 2017, which is assigned to the current assignee hereof and is incorporated herein by reference in its entirety.

FIELD OF THE DISCLOSURE

The present disclosure is related to non-light-emitting variable transmission devices and method of forming the same.

RELATED ART

A non-light-emitting variable transmission device can include an electrochromic stack where transparent conductive layers are used to provide electrical connections for the proper operation of the stack. When forming the non-light-emitting variable transmission device, a lower transparent conductive layer is deposited over a substrate and patterned to keep a subsequently-formed bus bars from electrically shorting to each other or having unacceptably high leakage current. Alternatively, the lower transparent conductive layer is not patterned within the non-light-emitting variable transmission device, and a bus bar is formed by printing a silver-containing ink directly on an upper transparent conductive layer. The ink or a component of the ink may migrate through microscopic defects in underlying layers and result in an electrical short to the lower transparent conductive layer or unacceptably high leakage current. Further improvement in non-light-emitting variable transmission devices is desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Patterned features, which include bus bars, holes, holes, etc., can have a width, a depth or a thickness, and a length, wherein the length is greater than the width and the depth or thickness. As used in this specification, a diameter is a width for a circle, and a minor axis is a width for an ellipse.

The term "normal operation" and "normal operating state" refer to conditions under which a non-light-emitting variable transmission device is designed to operate. The conditions may be obtained from a data sheet or other information regarding voltages, currents, capacitance, resistance, or other electrical conditions. Thus, normal operation does not include operating a non-light-emitting variable transmission device well beyond its design limits.

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

A non-light-emitting variable transmission device can include an electrochromic stack; a transparent conductive layer overlying the electrochromic stack; an intermediate layer overlying the transparent conductive layer and defining a hole; and a bus bar including a conductive tape that extends into the hole and contacts the transparent conductive layer. In an embodiment, proper selection of materials and design of a bus bar for the upper transparent conductive layer allow an electrical connection to be made to the upper transparent conductive layer without the need to cut the lower transparent conductive layer. In particular, the selection of materials for the bus bar provides sufficient electrical conductivity without a significantly adverse interaction with a material within the bus bar and a material within any of the underlying layers. Thus, an electrical short or a leakage current that is too high under normal operating conductive can be obviated.

In another aspect, a method of forming a non-light-emitting variable transmission device can include providing an electrochromic stack; forming a transparent conductive layer over the electrochromic stack; forming an intermediate layer over the transparent conductive layer; patterning the intermediate layer to define a hole that extends to the transparent conductive layer; and disposing a bus bar adjacent the intermediate layer, the bus bar extending into the hole and contacting the transparent conductive layer. Improved control in patterning allows a relatively thin intermediate layer to be used. When the patterning is performed using ablation, operating parameters for a laser can be selected to allow selective removal of the intermediate layer without removing too much of an underlying layer, such as the transparent conductive layer.

The process flows described above are flexible, and many of the patterning operations in forming holes or cutting lanes can be performed in many different orders. Thus, the process flow can be adapted to the needs or desires for a particular application or a facility or a combination of facilities where such operations may be performed.

The embodiments as illustrated in the figures and described below help in understanding particular applications for implementing the concepts as described herein. The embodiments are exemplary and not intended to limit the scope of the appended claims.

A. Formation of a Set of Layers 120

Figure 1:
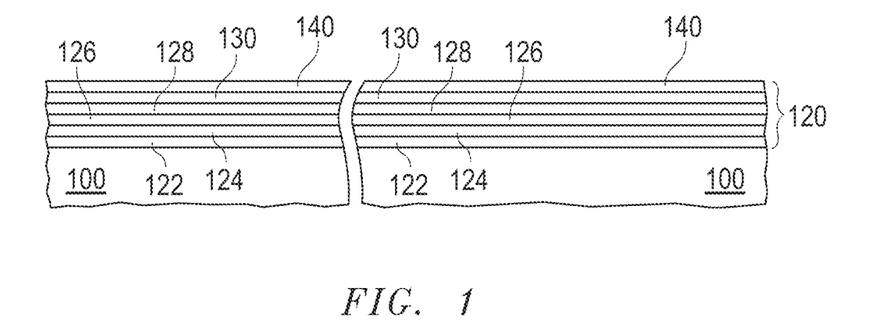
FIG. 1 includes an illustration of a cross-sectional view of portions of a workpiece including a substrate and a set of layers.

FIG. 1 includes an illustration of a cross-section view of a partially fabricated non-light-emitting variable transmission device after forming a set of layers 120 adjacent to a transparent substrate 100. In an embodiment, the substrate 100 can include a glass substrate, a sapphire substrate, an aluminum oxynitride substrate, or a spinel substrate. In another embodiment, the substrate 100 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 100 may or may not be flexible. In a particular embodiment, the substrate 100 can be float glass or a borosilicate glass and have a thickness in a range of 0.5 mm to 4 mm thick. In another particular embodiment, the substrate 100 can include ultra-thin glass that is a mineral glass having a thickness in a range of 50 microns to 300 microns. In a particular embodiment, the substrate 100 may be used for many different non-light-emitting variable transmission devices being formed and may referred to as a motherboard.

The compositions and thicknesses of the layers within a set of layers 120 are described before describing their formation. Transparent conductive layers 122 and 130 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 122 and 130 can include gold, silver, copper, nickel, aluminum, or any combination thereof. The transparent conductive layers 122 and 130 can have the same or different compositions.

The set of layers 120 further includes an active stack that includes the layers 124, 126, and 128 that are disposed between the transparent conductive layers 122 and 130. In an embodiment, the active stack is an electrochromic stack. The layers 124 and 128 are electrode layers, wherein one of the layers is an electrochromic layer, and the other of the layers is an ion storage layer (also referred to as a counter electrode layer). The electrochromic layer can include an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, or any combination thereof and have a thickness in a range of 50 nm to 2000 nm. The ion storage layer can include any of the materials listed with respect to the electrochromic layer or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 80 nm to 500 nm. An ion conductive layer 126 (also referred to as an electrolyte layer) is disposed between the electrode layers 124 and 128, and has a thickness in a range of 20 microns to 60 microns. The ion conductive layer 126 allows ions to migrate therethrough and does not allow a significant number of electrons to pass therethrough. The ion conductive layer 126 can include a silicate with or without lithium, aluminum, zirconium, phosphorus, boron; a borate with or without lithium; a tantalum oxide with or without lithium; a lanthanide-based material with or without lithium; another lithium-based ceramic material; or the like. The ion conductive layer 126 is optional and, when present, may be formed by deposition or, after depositing the other layers within the stack 120, reacting portions of two different layers, such as the electrode layers 124 and 128, to form the ion conductive layer 126. After reading this specification, skilled artisans will appreciate that other compositions and thicknesses for the layers 122, 124, 126, 128, and 130 can be used without departing from the scope of the concepts described herein.

An intermediate layer 140 can be used that will be disposed between the transparent conductive layer 130 and a subsequently-formed bus bar. In an embodiment, the intermediate layer 140 may provide better adhesion to the subsequently-formed bus bar, as compared to adhesion between the transparent conductive layer 130 and the subsequently-formed bus bar. In an embodiment, the intermediate layer 140 can include an insulating layer. In a particular embodiment, the intermediate layers can be an antireflective layer that can be used to help reduce reflection. The antireflective layer has an index of refraction between the underlying layers (refractive index of the underlying layers can be approximately 2.0) and clean, dry air or an inert gas, such as Ar or $N_2$ (many gases have refractive indices of approximately 1.0). In an embodiment, the antireflective layer has a refractive index in a range of 1.4 to 1.6. The antireflective layer can include an insulating material having a suitable refractive index. In a particular embodiment, the antireflective layer includes silica. The thickness of the antireflective layer is selected to be thin and provide the sufficient anti-reflective properties. The thickness for the antireflective layer can depend at least in part on the refractive index of the set of layers 120. The thickness of the intermediate layer 140 can be in a range of 20 nm to 100 nm.

The layers 122, 124, 126, 128, 130, and 140 can be formed over the substrate 100 without any intervening patterning steps, breaking vacuum, or exposing an intermediate layer to air before all the layers are formed. In an embodiment, the layers 122, 124, 126, 128, 130, and 140 can be serially deposited. The layers 122, 124, 126, 128, 130, and 140 may be formed using physical vapor deposition or chemical vapor deposition. In a particular embodiment, the layers 122, 124, 126, 128, 130, and 140 are sputter deposited.

B. Patterning Portions of the Set of Layers 120

Processing can continue with selectively removing portions of one or more of the layers within the set of layers 120 at desired locations. The order of performing some actions regarding selectively removing portions of layers and disposing bus bars may be performed in a different order than what is presented. Thus, after reading the specification, skilled artisans will be able to determine what order to perform the actions to meet the needs or desires for a particular application or equipment configuration within a facility or different facilities.

1. Hole 222 to the Lower Transparent Conductive Layer 122

Figure 2:
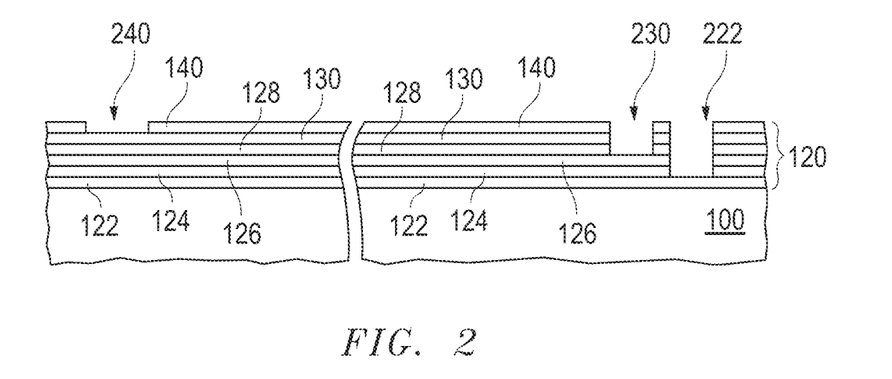
FIG. 2 includes an illustration of a cross-sectional view of the workpiece of FIG. 1 patterning layers to define holes.

A hole 222 corresponds to a region where a bus bar will be electrically connected to the lower transparent conductive layer 122. The hole 222 extends through the layers 140, 130, 128, 126, and 124 to the lower transparent conductive layer 122. In another embodiment, the hole 222 may extend through the lower transparent conductive layer 122, and a bus bar may contact the sidewalls of the lower transparent conductive layer 122. In a further embodiment, the hole 222 may extend through different layers. The width of the hole 222 is sufficient to allow low contact resistance to the lower transparent conductive layer 122. In an embodiment, the hole 222 is the same width or is narrower than the bus bar that will contact the lower transparent conductive layer 122. The hole 222 has a length (extending into and out of the drawing) that may extend completely to cutting lanes or may stop before reaching such cutting lanes. The hole 222 can be defined using an ablation, sputter etch, or ion milling technique.

2. Hole 230 to Sever the Upper Transparent Conductive Layer 130

A hole 230 keeps a bus bar that will contact the lower conductive layer 122 within the hole 222 from being electrically connected to the portion of the upper transparent conductive layer 130 that is used in controlling the non-light-emitting variable transmission device. Thus, the hole 230 extends at least through the intermediate layer 140 and the upper transparent conductive layer 130. In embodiment as illustrated, the hole 230 extends through the intermediate layer 140, the upper transparent conductive layer 130, and the upper electrode 128. In another embodiment (not illustrated), the hole 230 may extend though the ion conductive layer 126 or may further extend through the lower electrode layer 124. The hole 230 is closer to the hole 222 than to a hole 240. In a particular embodiment, the hole 230 is spaced apart from the hole 222, so that a bus bar that will contact the lower transparent conductive layer 122 within the hole 222 does not make unintentional contact with the upper transparent conductive layer 130 within the hole 230. However, as the hole 230 is farther from the hole 222, the effective area of a non-light-emitting variable transmission region (the region where variable optical transmission occurs) is reduced. Thus, the hole 230 can be in a range of 50 microns to 4 cm from the hole 222. In another embodiment, the hole 230 may be closer or farther from the hole 222 as compared to the range previously described. The hole 230 has a length (extending into and out of the drawing) that may extend completely to the cutting lanes or may stop before reaching such cutting lanes. The hole 230 can be defined using any of the techniques previously described with respect to the hole 222. The technique used to define the hole 230 may be the same or different as compared to define the hole 222, or any combination thereof.

3. Hole 240 to Expose the Upper Transparent Conductive Layer 130

The hole 240 through the intermediate layer 140 corresponds to a region where a bus bar will be electrically connected to the upper transparent conductive layer 130. Thus, the hole 240 extends at least through the intermediate layer 140. In embodiment as illustrated, the hole 240 extends through the intermediate layer 140 and partly into the upper transparent conductive layer 130. The hole 240 may be the only hole for contacting the upper transparent conductive layer 130 for the non-light-emitting variable transmission device, or one or more other holes may also be formed. The hole 240 or the holes, including the hole 240, can have the same or narrower width than the bus bar for the upper transparent conductive layer 130. The pattern for the hole 240 or holes, including the hole 240, has a length (extending into and out of the drawing) that may extend completely to cutting lanes or may stop before reaching such cutting lanes. The patterning of the hole 240 can use any of the techniques as previously described.

When an ablation technique is used, the process may be controlled to a greater degree as compared the holes 222 and 230. The wavelength of the radiation emitted from the laser is sufficiently to cause the intermediate layer 140 to be ablated. If possible, wavelength is selected so that it does not significantly affect the underlying layers. Sometimes, this may not be possible. In an embodiment, the laser emits radiation in a range of 500 nm to 600 nm. The pulse duration for the laser can be less than the pulse duration when forming the holes 222 and 230. In an embodiment, the pulse duration when forming the hole 240 can be at most 1000 fs. The holes 222 and 230 can be formed using a longer pulse duration, such as 10 ps and higher. The shorter pulse duration for holes 240 may provide better control, and therefore, shorter pulse duration may be needed or desired, particularly as the intermediate layer 140 becomes thinner. Thus, the pulse duration for the hole 240 may be at most 700 fs, at most 500 fs, or no greater than 300 fs. Typically, the pulse duration will be at least 1 fs. In a particular embodiment, the pulse duration can be in a range of 110 fs to 500 fs. The energy density is selected do that laser ablation does not remove too much of the upper transparent conductive layer 130. In an embodiment, the energy density can be in a range of 0.05 J/cm$^2$ to 1.0 J/cm$^2$.

Ideally, none of the upper transparent conductive layer 130 is removed when forming the opening 240. In practice, some of the upper transparent conductive layer 130 is removed, but the amount can be relatively small. In an embodiment, the difference in thickness between a portion of the upper conductive layer 130 covered by the intermediate layer 140 and another portion of the upper conductive layer 130 within the hole 240 is at most 2 nm. Further control of the ablation process can further reduce the difference to at most 1.5 nm, at most 1 nm, or at most 0.5 nm. With continuing development of lasers used for ablation may allow for a difference under 0.5 nm. The difference in thickness between the portions of the upper transparent layer 130 may be expressed as a percentage of the thickness of the upper conductive layer 130 exposed under the hole 240 as compared to the portion of the upper conductive layer 130 covered by the intermediate layer 140. The thickness of the exposed portion can be least 90% of the thickness of the covered portion. Further control of the ablation process can allow the percentage to be at least 95% or at least 99%. With continuing development of lasers used for ablation may allow the percentage difference to be greater than 99%.

Figure 3:
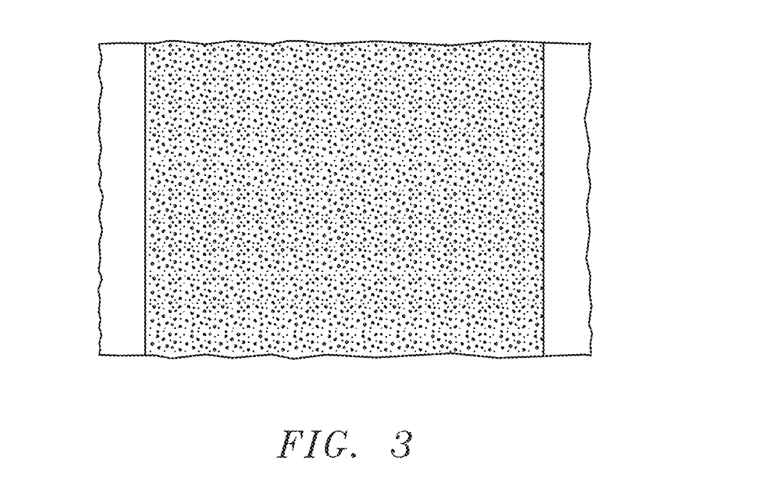
FIG. 3 includes an illustration of a top view of a hole pattern for making contact to an upper transparent conductive layer in accordance with an embodiment.
Figure 4:
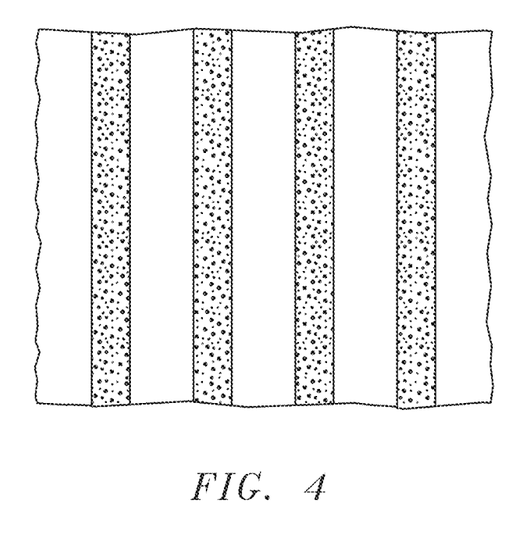
FIG. 4 includes an illustration of a top view of another hole pattern for making contact to the upper transparent conductive layer in accordance with another embodiment.
Figure 5:
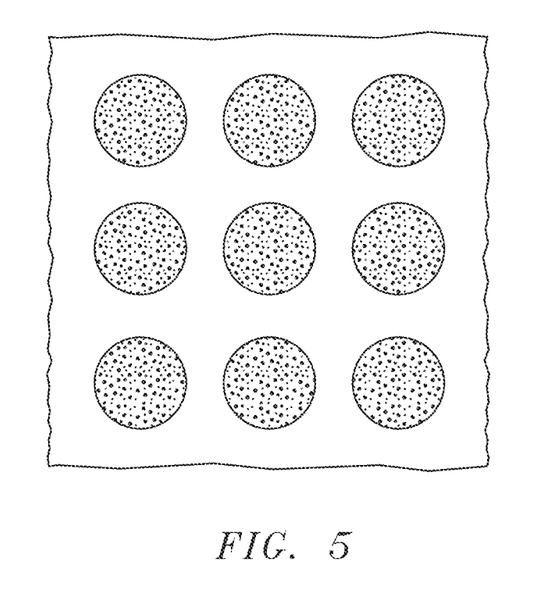
FIG. 5 includes an illustration of a top view of a further hole pattern for making contact to the upper transparent conductive layer in accordance with a further embodiment.

The hole 240 can be a single hole through the intermediate layer 140 or may be one of many other holes. FIGS. 3 to 5 include top view illustrations of portions of patterns for the hole 240 or holes though the intermediate layer 140. FIG. 3 has a pattern that corresponds to a single, relatively wider, long hole, FIG. 4 has a pattern that corresponds to a set of relatively narrower, long, spaced-apart holes, and FIG. 5 has a spot pattern that includes many holes.

FIGS. 3 and 4 can be formed using lines during patterning. In an embodiment, FIG. 3 can be formed using laser ablation along overlapping lines, and thus, FIG. 3 can have a pattern corresponding to a set of overlapping lines. In another embodiment, FIG. 4 can be formed using laser ablation along spaced-apart lines, and thus, FIG. 4 can have a pattern corresponding to a set of spaced-apart holes oriented along lines. The relatively narrower, long, spaced-apart holes in FIG. 4 may have approximately the same width or significantly different widths (more than 10% difference between any two holes). Other patterns may be used. One or more of the holes can be in the form of a serpentine pattern or a square wave pattern. In a further embodiment, the set of holes in FIG. 4 may be replaced by fewer holes (possibly even a single hole) having serpentine pattern, a square wave pattern, or another suitable pattern.

The holes in FIG. 5 are in the form of a spot pattern. The holes in FIG. 5 are illustrated as circles, although other shapes may be used. For examples, the shapes can be other polygons (e.g., triangles, rectangles, hexagons, octagons, or the like) or other two-dimensional shapes (e.g., ellipses, ovals, irregular shapes, etc.). All of the holes can be approximately the same size and type of shape, such as all circles, or the shapes may have different sizes (more than 10% difference between any two shapes), different shapes, or both different sizes and shapes. The spot pattern can be uniform pattern (as illustrated in FIG. 5 with a uniform pitch for the holes along each of the rows and columns) or a non-uniform pattern (not illustrated).

In a further embodiment (not illustrated), a hybrid of holes described with respect to FIGS. 4 and 5 may be used. For example, one or more holes having shapes described with respect to FIG. 5 may be placed between trenches described with respect to FIG. 4. FIGS. 4 and 5 may help when an adhesive layer of the bus bars has better adhesion to the intermediate layer 140 as compared to the upper transparent conductive layer 130. After reading this specification, skilled artisans will be able to determine whether one hole or more than one hole will extend through the intermediate layer 140 and the pattern of the holes or holes to achieve the needs or desires for a particular application.

C. Bus Bars 622 and 630

Bus bars 622 and 630 are disposed within the holes 222 and 240, respectively, and over portions of the intermediate layer 140. Details regarding the bus bar 630 are described before bus bar 622, as issues regarding bus bar 630 and the underlying layers may put more limitations on materials used for the bus bar 630 as compared to the bus bar 622. However, some properties may be common to both bus bars 622 and 630. In an embodiment, the bus bars 622 and 630 are non-penetrating bus bars, meaning that conductive material from the bus bars 622 and 630 does not migrate and electrically short the transparent conductive layers 122 and 130 and bus bars 622 and 630 to each other. Thus, the bus bars 630 can be located over the lower transparent conductive layer 122 without needing the lower transparent conductive layer 122 patterned to prevent an electrical short between the bus bars 622 and 630 via the lower transparent conductive layer 122. The bus bars 622 can cover all of the exposed portion of the lower transparent conductive layer 122. The bus bar 630 can cover all of the exposed portion (e.g., pattern corresponding to FIG. 3) or exposed portions (e.g., pattern corresponding to FIG. 4 or 5) of the upper transparent conductive layer 130. Thus, the widths of the bus bars 62 and 630 can be sufficient to cover exposed portions of the transparent conductive layers 122 and 130, respectively.

1. Bus Bar 630

Figure 6:
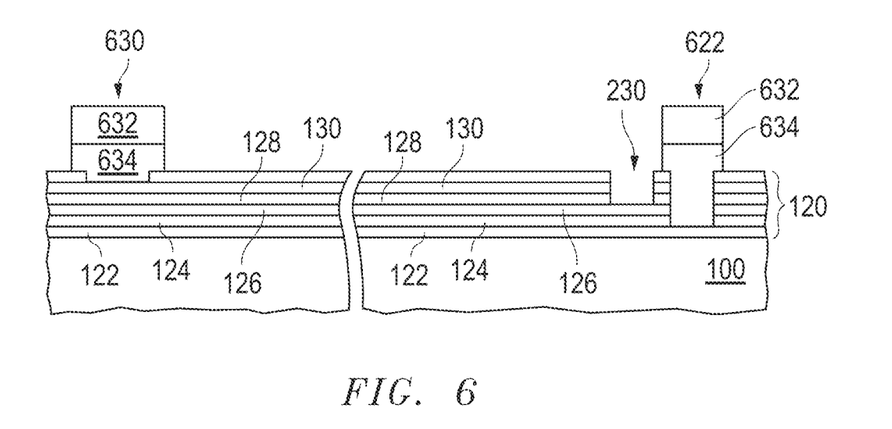
FIG. 6 includes an illustration of a cross-sectional view of the workpiece of FIG. 3 after disposing bus bars over the patterned set of layers.

The composition of the bus bar 630 is selected so as to not form an electrical short or too much leakage current (higher than the specification for leakage current during normal operation of the non-light-emitting variable transmission device) between the bus bar 630 to the portion of the lower transparent conductive layer 122 is covered by bus bar 630. The composition of the bus bar 630 can include copper, gold, carbon, titanium, tin, zinc, or any metal element within the upper conductive layer 130. When carbon is used, it may be in the form of carbon black, nanowires or another fullerene compound. The composition may include a metal alloy that includes at least one of the metals or an oxide or a nitride that include one or more of the metals or metals alloys. In another embodiment, the composition may include a conductive polymer. The composition of the bus bar 630 may include a constituent making up the upper transparent conductive layer 130. For example, when upper conductive layer 130 includes a tin oxide, such as indium-doped tin oxide, the composition may include tin or tin oxide. When upper conductive layer 130 includes a zinc oxide, such as aluminum-doped zinc oxide, the composition may include zinc or zinc oxide.

The inventors have discovered that silver, silver-containing compounds and silver-containing alloys may cause a problem. When silver or a silver-containing compound or alloy is used, the likelihood of forming an electrical short or too much leakage current is substantially higher than the other materials described regarding the composition of the bus bar 630. Although not meant to be bound by theory, the inventors believe that silver may have an interaction with lithium within the electrochromic stack 120. Thus, any element or compound that is believed to have an adverse interaction with the intercalating element (e.g., H, Li, or Na) may not be used in the bus bar 630. Other elements that are problematic may not be included within the composition of the bus bar 630.

The construction of the bus bar 630 can be a conductive tape that includes a backing substrate 632 and an adhesive layer 634. The backing substrate 632 carries most of the current along the bus bar 630. The backing substrate 632 can be in the form of a foil that includes a conductive metal, metal alloy, metal-containing compound, or polymer. In an embodiment, the backing substrate has a resistivity of at most 9 $\mu\Omega$-cm. In another embodiment, the backing substrate 632 has a resistivity in a range of 1 $\mu\Omega$-cm to 7 $\mu\Omega$-cm, or 1.5 $\mu\Omega$-cm to 6.5 $\mu\Omega$-cm, or 2 $\mu\Omega$-cm to 6 $\mu\Omega$-cm. The backing substrate 632 can have a thickness such that it can made to comply with the topography of the non-light-emitting variable transmission device, such as a transition between the elevation of the substrate 100 and the elevation of the intermediate layer 140. In an embodiment, the thickness is at most 900 microns. In another embodiment, the thickness can be substantially thinner, such as at most 300 microns or at most 95 microns. The bus bar 630 may become difficult to handle if the backing substrate 632 is too thin. In an embodiment, the backing substrate 632 can have a thickness of at least 2 microns.

The linear resistance of the bus bar 630 can be expressed as ohms/m along the length of the bus bar and can be controlled by the cross-sectional area of backing substrate 632. If a lower linear resistance is desired, a relatively thicker, relatively wider, or a combination of a relatively thicker and wider backing substrate 632 can be used. If a higher linear resistance is desired, a relatively thinner, relatively narrower, or a combination of a relatively thinner and narrow backing substrate 632 can be used. After reading this specification, skilled artisans will be able to select the thickness and width of the backing substrate 632 to meet physical (e.g., no exposed upper transparent conductive layer 130) and electrical performance (e.g., acceptable linear resistance).

The adhesive layer 634 can include an adhesive material with conductive particles to allow and electrical conduction between the upper transparent conductive layer 130 and the backing substrate 632. The selection of materials previously described with respect to the backing substrate 632 may also apply to the conductive particles within the adhesive layer 634. In an embodiment, the adhesive component within the adhesive layer can be a pressure-sensitive adhesive. The adhesive component within the adhesive layer 634 can be an epoxy, a silicone rubber, a polyvinyl butyral, a polyvinyl acetate, or the like. The adhesive layer 634 can have a thickness such that it can directly contact the upper transparent conductive layer 130 through the opening 240 in the intermediate layer 140. When the bus bar 622 (described below) is identical to the bus bar 630, the adhesive layer 634 can have a thickness such that it can contact the lower transparent conductive layer 122 through the opening 222 that extends through layers 124, 126, 128, 130, and 140. In an embodiment, the thickness is at most 900 microns. A thinner adhesive layer 634 can help to keep resistance between the upper transparent conductive layer 130 and the backing substrate 632 relatively lower than a thicker adhesive layer 634. In another embodiment, the thickness can be at most 300 microns or at most 95 microns. The bus bar 630 may not adhere properly if the adhesive layer 634 is discontinuous along the surface of the backing substrate 632. In an embodiment, the bus bar 630 can have a thickness of at least 1.1 microns.

If needed or desired, the bus bar 630 may be cut, machine pressed, or the like to achieve a desired shape. A release film (not illustrated) can be removed, and the bus but 630 can be applied so that the adhesive layer 634 extends through the hole 240 and contacts the upper transparent conductive layer 130. In an embodiment, a roller may be used to press the bus bar 630 and ensure proper adhesion and electrical contact to the upper transparent conductive layer 130.

2. Bus Bar 622

The design considerations for the bus bar 622 are less stringent as compared to the bus bar 630. In an embodiment, the bus bar 622 can include any of materials, configurations, and designs as described with respect to the bus bar 630. When the bus bars 622 and 630 are identical, inventory management becomes easier, and the likelihood of misprocessing (attaching a bus bar to the wrong transparent conductive layer) is obviated.

In another embodiment, the bus bar 622 has a material or design that is different from the bus bar 630. For example, the bus bar 622 can include silver without significantly adversely affecting the device. Further, the bus bar 622 can be formed using a different process. For example, the bus bar 622 can be applied in the form of a conductive ink, such as an ink including a silver frit, and fired. Thus, greater latitude exists for the bus bar 622 as compared the bus bar.

In another embodiment, the step height when transitioning from the intermediate layer 140 to the lower transparent conductive layer 122 may be significant as compared to the thickness of the bus bar 622 that contacts the transparent conductive layer 122. In such an embodiment, the layers 124, 126, 128, 130, and 140 may be patterned to define the trench 222, such that the trench 222 is wider than the width of the bus bar 622. The wider trench 222 can allow for better (lower) contact resistance between the bus bar 622 and the lower transparent conductive layer 122.

In a further embodiment, a conductive material may be formed within the opening 222 before applying the bus bar 622. The conductive material can help to reduce the depth that the adhesive layer of the bus bar 622 needs to extend into the hole 222. When the conductive material is used, the thickness of the adhesive layer within the bus bar 622 can be thinner and provide a lower resistance connection. The conductive material can be applied as an ink including conductive particles and be fired before applying the bus bars 622 and 630.

D. Subsequent Processing

If needed or desired, the substrate 100 can be in the form of a motherboard that can be cut into individual panels. Portions of the stack of layers 122, 124, 126, 128, 130, and 140 can be removed at regions where the motherboard will be cut into individual non-light-emitting variable transmission panels Each individual panel includes a non-light-emitting variable transmission device that include portions of the electrode layers 124 and 128 and the ion conductive layer 126. In an embodiment, the removal can be performed using any of the techniques previously described regarding the hole 222, except that the removal is extended to remove the lower transparent conductive layer 122 and expose the underlying substrate 100. After the removal, the motherboard can be cut to separate the motherboard into individual non-light-emitting variable transmission devices. The removal of the portions of the layers to expose the motherboard along cutting lanes and cutting the motherboard into individual non-light-emitting variable transmission devices can be performed before or after bus bars 622 and 630 are disposed over the set of layers 120. In an alternative embodiment, the substrate 100 may have a shape corresponding to a finished non-light-emitting variable transmission device before forming the layers 122, 124, 126, 128, 130, and 140. Thus, the removal or cutting operations are not required in all embodiments.

Figure 7:
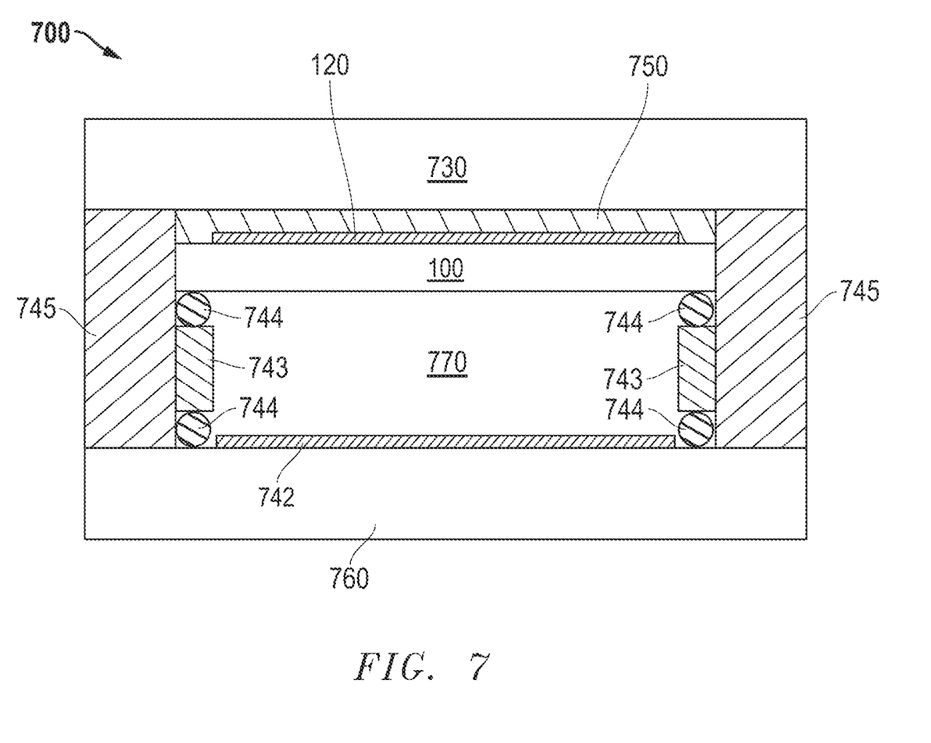
FIG. 7 includes an illustration of a cross-sectional view of an insulated glass unit that includes the workpiece of FIG. 6 in accordance with an embodiment.

FIG. 7 includes an illustration of an exemplary insulated glass unit 700. The insulated glass unit 700 includes an outer substrate 730 and the set of layers 120 and the substrate 100. Although not identified in FIG. 7, the set of layers 120 includes the layers 122, 124, 126, 128, 130, and 140. The bus bars 622 and 630 are present but not illustrated in FIG. 7. An interlayer 750 is disposed between the outer substrate 730 and the set of layers 120. The interlayer 750 may be a lamination adhesive. The interlayer 750 can include a thermoplastic, such as polyurethane, ethylene vinyl acetate (EVA), polyvinyl butyral (PVB), or the like. The outer substrate 730 is coupled to a pane 760. Each of the outer substrate 730 and pane 760 can be a toughened or a tempered glass and have a thickness in a range of 2 mm to 7 mm. A low-emissivity layer 742 can be disposed along an inner surface of the pane 760. The substrate 100 and the pane 760 can be spaced apart by a spacer bar 743. The spacer bar 743 is coupled to the substrate 100 and pane 760 via seals 744. The seals 744 can be a polymer, such as polyisobutylene. An adhesive joint 745 is designed to hold the substrate 100 and the pane 760 together and is provided along the entire circumference of the edges of the substrate 100 and the pane 760. An internal space 770 of the IGU 700 may include a relatively inert gas, such as a noble gas or clean dry air. In another embodiment, the internal space 770 may be evacuated.

Figure 8:
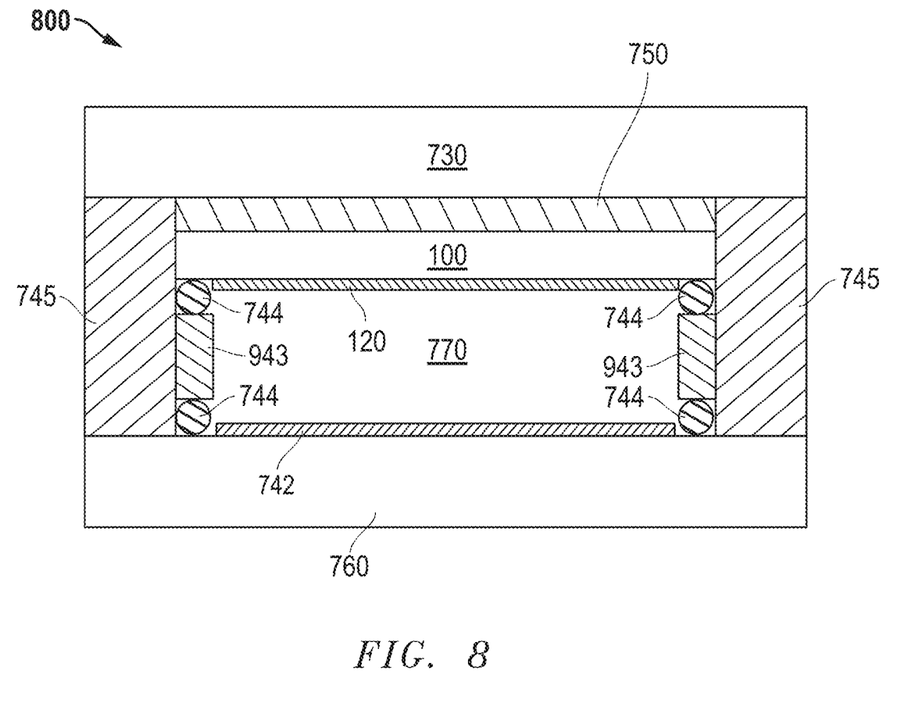
FIG. 8 includes an illustration of a cross-sectional view of another insulated glass unit that includes the workpiece of FIG. 6 in accordance with another embodiment.

FIG. 8 includes an illustration of another exemplary insulated glass unit 800. The insulated glass unit 800 includes a similar non-light-emitting variable transmission device to that of the insulated glass unit 700, except that the set of layers 120 is opposite the outer separate substrate 730. The interlayer 750 is disposed between the outer substrate 730 and the substrate 100.

In another embodiment, a different configuration for an IGU may be used. After reading this specification, skilled artisans will be able to determine a design for an IGU to meet the needs or desires for a particular application.

The non-light-emitting variable transmission device may be in the form of a vehicle window, such as part of a moon roof, a side passenger window, or the like. A bending or shaping operation may be performed to achieve a desired shape, such as slightly curved to conform to the curvature of a vehicle.

Another subsequent operation may be performed in conjunction with or in place of another operation previously described. Thus, the embodiments related to subsequent processing are merely illustrative and do not limit the scope of the present invention as defined in the appended claims.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. A non-light-emitting variable transmission device, including: an electrochromic stack; a first transparent conductive layer overlying the electrochromic stack; an intermediate layer overlying the first transparent conductive layer and defining a first hole; and a first bus bar including a first conductive tape that extends into the first hole and contacts the first transparent conductive layer.

Embodiment 2. The non-light-emitting variable transmission device of Embodiment 1, wherein the intermediate layer directly contacts the first transparent conductive layer.

Embodiment 3. The non-light-emitting variable transmission device of any one of Embodiments 1 and 2, further including a second transparent conductive layer disposed under the electrochromic stack.

Embodiment 4. The non-light-emitting variable transmission device of Embodiment 3, further including an electrochromic layer.

Embodiment 5. The electrochromic device of Embodiment 4, further including an ion storage layer, an ion conductive layer, or both an ion storage layer and an ion conductive layer.

Embodiment 6. The non-light-emitting variable transmission device of any one of Embodiments 3 to 5, further including a second bus bar including a second conductive tape, the second conductive tape of the second bus bar extending into a second hole of the intermediate layer and contacting a second transparent conductive layer, wherein the first hole is spaced apart from the second hole.

Embodiment 7. The non-light-emitting variable transmission device of any one of Embodiments 3 to 6, wherein the first bus bar does not contact any layer of an electrochromic stack or the second transparent conductive layer.

Embodiment 8. The non-light-emitting variable transmission device of any one of the preceding Embodiments, wherein at least one of the first hole and the second hole includes a pattern of holes extending through the intermediate layer to the first transparent conductive layer.

Embodiment 9. The non-light-emitting variable transmission device of Embodiment 8, wherein the pattern of holes includes a spot pattern including a matrix of spots, a line pattern including a set of spaced-apart lines, or a line pattern including a set of overlapping lines.

Embodiment 10. The non-light-emitting variable transmission device of any one of the preceding Embodiments, wherein the first transparent conductive layer has a first thickness at a location under the first hole and a second thickness at another location spaced apart from the first hole, wherein the first thickness is less than the second thickness.

Embodiment 11. The non-light-emitting variable transmission device of Embodiment 10, wherein the first thickness is at least 90%, or at least 95%, or at least 99% of the thickness of the second thickness.

Embodiment 12. The non-light-emitting variable transmission device of any one of Embodiments 10 and 11, wherein a difference between the first thickness and the second thickness is no greater than 2 nm, or no greater than 1.5 nm, or no greater than 1 nm, or no greater than 0.5 nm.

Embodiment 13. The non-light-emitting variable transmission device of any one of the preceding Embodiments, wherein the first conductive tape includes a backing substrate and a conductive adhesive.

Embodiment 14. The non-light-emitting variable transmission device of Embodiment 13, wherein the conductive adhesive includes an element or a compound that is also contained in the first transparent conductive layer.

Embodiment 15. The non-light-emitting variable transmission device of any one of Embodiments 13 and 14, wherein the conductive adhesive includes copper, gold, carbon, titanium, tin, zinc, an alloy thereof, an oxide thereof, a nitride thereof, or any combination thereof.

Embodiment 16. The non-light-emitting variable transmission device of any one of the preceding Embodiments, wherein at least one of the first transparent conductive layer and the second transparent conductive layer includes a metal, a metal oxide, a carbon-based material, or any combination thereof.

Embodiment 17. The non-light-emitting variable transmission device of Embodiment 16, wherein the metal oxide includes a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene).

Embodiment 18. The non-light-emitting variable transmission device of Embodiment 16, wherein the metal includes gold, silver, copper, carbon, nickel, aluminum, or any combination thereof.

Embodiment 19. The non-light-emitting variable transmission device of any one of the Embodiments 13 to 18, wherein the conductive adhesive does not contain silver.

Embodiment 20. The non-light-emitting variable transmission device of any one of the preceding Embodiments, wherein at least one of the first and second bus bars has a backing substrate having a resistivity in a range of 1 $\mu\Omega$-cm to 7 $\mu\Omega$-cm, or 1.5 $\mu\Omega$-cm to 6.5 $\mu\Omega$-cm, or 2 $\mu\Omega$-cm to 6 $\mu\Omega$-cm.

Embodiment 21. A method of forming a non-light-emitting variable transmission device, the method including: providing an electrochromic stack; forming a first transparent conductive layer over the electrochromic stack; forming an intermediate layer over the first transparent conductive layer; patterning the intermediate layer to define a first hole that extends to the first transparent conductive layer; and disposing a first bus bar adjacent the intermediate layer, the first bus bar extending into the first hole and contacting the first transparent conductive layer.

Embodiment 22. The method of Embodiment 21, wherein the non-light-emitting variable transmission device includes the non-light-emitting variable transmission device of any one of Embodiments 1 to 20.

Embodiment 23. The method of any one of Embodiments 21 and 22, wherein patterning the intermediate layer includes performing laser ablating the intermediate layer.

Embodiment 24. The method of any one of Embodiments 21 to 23, wherein laser ablating is performed using a laser having a pulse duration of at most 1000 femtoseconds, or at most 700 femtoseconds, or at most than 500 femtoseconds, or at most 300 femtoseconds.

Embodiment 25. The method of any one of Embodiments 21 to 24, wherein patterning the intermediate layer includes forming a pattern of holes that includes a spot pattern or a line pattern.

Embodiment 26. The method of Embodiment 25, wherein the pattern includes a matrix of spots, a set of discrete lines, or a set of overlapping lines.

Embodiment 27. The method of any one of Embodiments 21 to 26, wherein a difference between a thickness of the first transparent conductive layer at a location under the hole and a thickness of the first transparent conductive layer at the location prior to patterning the intermediate layer to form the hole is at most 2 nm, or at most 1.5 nm, or at most 1 nm, or at most 0.5 nm.

Embodiment 28. The method of any one of Embodiments 21 to 27, wherein a thickness of the first conductive layer at a location under the hole is at least 90%, at least 95%, or at least 99% of a thickness of the transparent conductive layer at the location prior to patterning the intermediate layer to form the hole.

Embodiment 29. The method of any one of Embodiments 21 to 28, wherein disposing the first bus bar includes applying a conductive tape adjacent the intermediate layer, the conductive tape including a backing substrate and a conductive adhesive.

Embodiment 30. The method of any one of Embodiments 21 to 29, further including disposing a second bus bar adjacent the intermediate layer, the second bus bar extending into a second hole in the intermediate layer and contacting a second transparent conductive layer.

Embodiment 31. The non-light-emitting device or the method of any one of the preceding Embodiments, wherein the intermediate layer includes an insulating layer.

Embodiment 32. The non-light-emitting device or the method of any one of the preceding Embodiments, wherein the intermediate layer is an antireflective layer.

Embodiment 33. The non-light-emitting variable transmission device or the method of any one of the preceding Embodiments, wherein the active stack is an electrochromic stack.

E. Example

Figure 9:
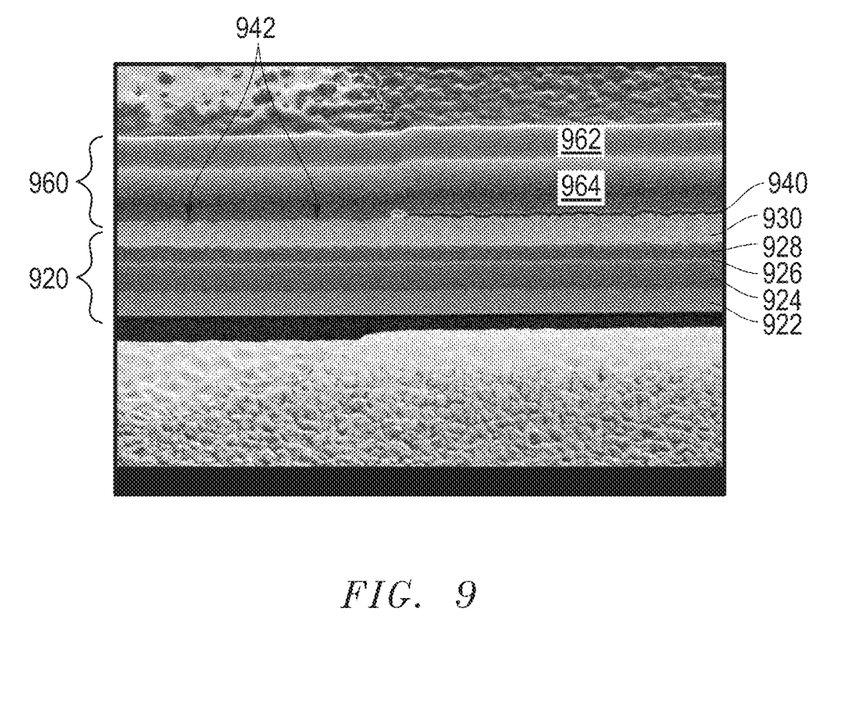
FIG. 9 includes a scanning electron microscope image of a portion of a workpiece after a bus bar is disposed over an antireflective layer and within a hole extending through the antireflective layer.

An example is provided to demonstrate that a non-light-emitting variable transmission device with a bus bar contacting an upper transparent conductive layer through a hole in an antireflective layer, where portions of the upper transparent conductive layer are nearly the same under the hole and under a remaining part of the antireflective layer. FIG. 9 includes a scanning electron microscope image illustrating a non-light-emitting variable transmission device that includes a bus bar 960 contacting an upper transparent conductive layer 930 at a hole in an antireflective layer 940. The bus bar 960 includes a backing substrate 962 and an adhesive layer 964.

A set of layers 920 were formed over a transparent glass substrate 900. The layers included a lower transparent conductive layer 922 that included indium-doped tin oxide (ITO), an electrochromic layer 924 that included $WO_3$, an ion conductive layer 926 that included silica, an ion storage layer 928 that included a Li—Ni—W oxide material, an upper transparent conductive layer 930 that included ITO, and an antireflective layer 940 that included silica. One of more of the layers 924, 926, and 928 included Li. As formed, the upper transparent conductive layer 930 had a thickness of 420 nm, and the antireflective layer 940 had a thickness of 75 nm. The antireflective layer 940 was patterned using a green laser beam having a wavelength of 515 nm at a pulse duration of 300 fs at an energy density of approximately 0.5 J/cm2, and a laser overlap of 50%. A bus bar 960 was disposed over the antireflective layer 940 and within the hole 942 extending through the antireflective layer 940. The bus bar 960 was EL-90038™-brand bus bar tape (available from Adhesives Research, Inc. of Glen Rock, Pa., USA) having a 35 micron thick electronic grade tin-coated copper foil and a 25 micron thick conductive adhesive.

Figure 10:
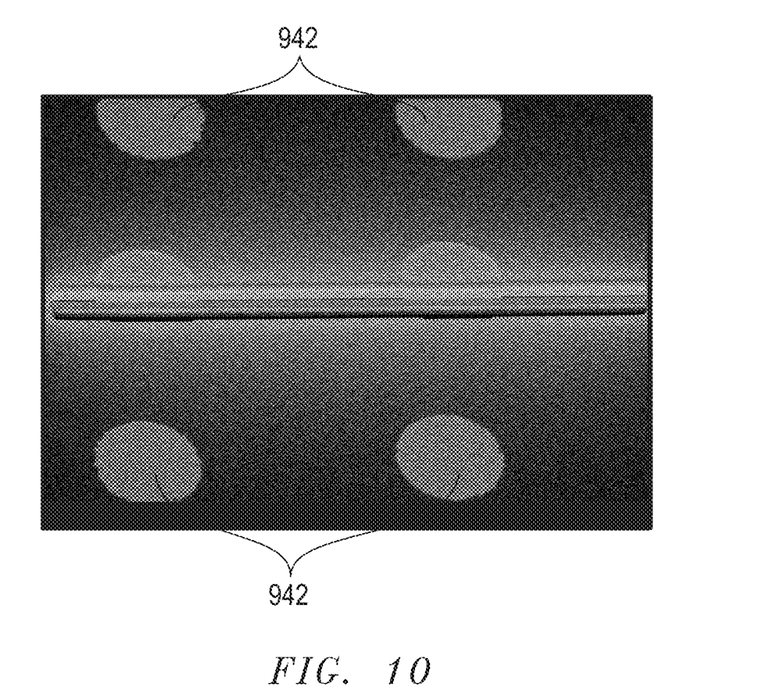
FIG. 10 includes a scanning electron microscope image of a portion of a workpiece after forming holes extending through the antireflective layer in accordance with an embodiment as described herein.

As seen in FIG. 9, very little of the upper transparent conductive layer 930 underlying the hole 942 in the antireflective layer 940 was removed. Only approximately 20 nm of the upper transparent conductive layer 930 was removed within the opening. FIG. 10 includes a top view at a slight angle. The upper transparent conductive layer 930 and none of the underlying layers are exposed within the holes.

Figure 11:
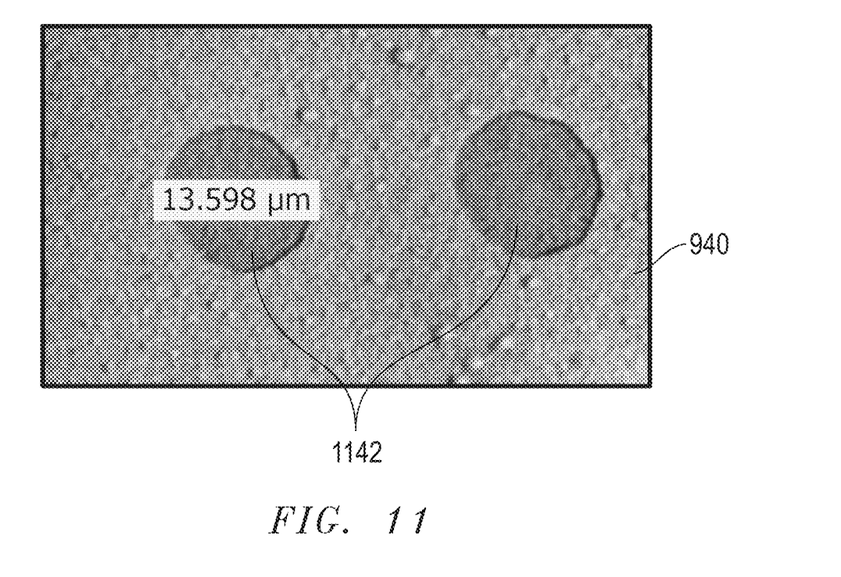
FIG. 11 includes a scanning electron microscope image of a portion of a workpiece after forming holes extending through the antireflective layer in accordance with an embodiment as described herein.
Figure 12:
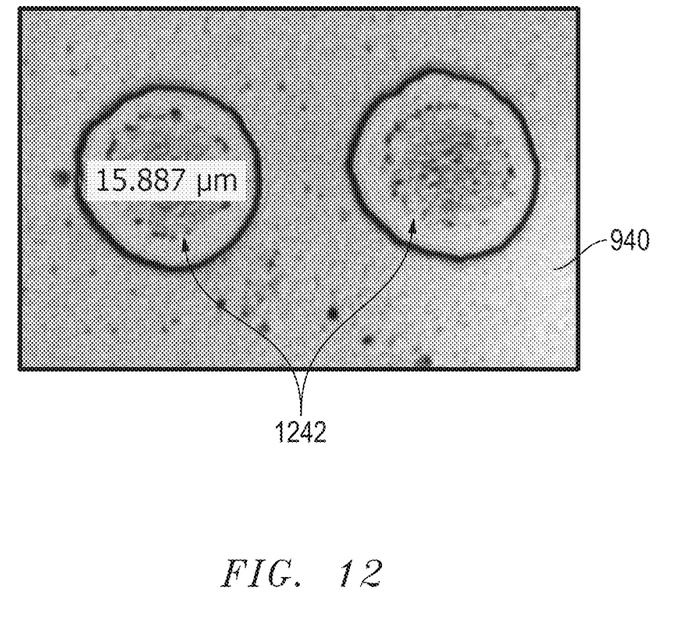
FIG. 12 includes a scanning electron microscope image of a portion of a workpiece after forming holes extending through the antireflective layer in accordance with a comparative example.

FIGS. 11 and 12 are similar to FIG. 9 except that the pulse duration used in FIG. 11 is 1 ps, and the pulse duration used in FIG. 12 is 10 ps. As seen in FIG. 11, a pulse duration of 1 ps can be used without exposing any layer underlying the upper transparent conductive layer 930. In particular, a pulse duration of 1 ps can be used without exposing the ion storage layer 928. The upper transparent conductive layer 930 is visible within the holes 1142 but not the ion storage layer 928. In FIG. 12, a pulse duration of 10 ps is used. Unlike the embodiments illustrated in FIGS. 9 to 11, the entire thickness of the upper transparent conductive layer 930 within the center of the holes 1242, and portions of the ion storage layer 928 is exposed and damaged when forming the holes. Thus, a pulse duration of 1 ps can be used; however, a pulse duration of 10 ps causes a significant risk of exposing and damaging an underlying layer when patterning the antireflective layer 940 to expose the upper transparent conductive layer 930.

The new bus bar architecture and method of forming has improved conductivity (lower resistance). The new bus bar architecture has a resistance of approximately 3.3 mOhm/m of bus bar length. A comparative architecture using a silver frit ink for the bus bars has a resistance of approximately 5.4 mOhms/m of bus bar length. Thus, the resistance is approximately 40% lower with the new bus bar architecture.

F. Benefits

Embodiments can provide benefits as compared to conventional designs and processes for non-light-emitting variable transmission devices. Proper selection of materials and design of a bus bar for the upper transparent conductive layer allow an electrical connection to be made to the upper transparent conductive layer without the need to cut the lower transparent conductive layer. In particular, the selection of materials for the bus bar provides sufficient electrical conductivity without a significantly adverse interaction with a material within the bus bar and a material within the underlying layers. Thus, an electrical short or a leakage current that is too high under normal operating conductive can be obviated. Improved control can allow a relatively thin antireflective Improved control in patterning allows a relatively thin intermediate layer to be used. When the patterning is performed using ablation, operating parameters for a laser can be selected to allow selective removal of the intermediate layer without removing too much of an underlying layer, such as the upper transparent conductive layer.

The process flows described above are flexible, and many of the patterning operations in forming holes, holes, or the high resistance region can be performed in many different orders. Thus, the process flow can be adapted to the needs or desires for a particular application or a facility or a combination of facilities where such operations may be performed.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A non-light-emitting variable transmission device, comprising:
   an active stack;
   a first transparent conductive layer overlying the active stack;
   a second transparent conductive layer, wherein the active stack is between the first transparent conductive layer and the second transparent conductive layer;
   an intermediate layer overlying the first transparent conductive layer and defining a first hole;
   a first bus bar comprising a first backing substrate and a first adhesive layer, wherein the first bus bar extends into the first hole and contacts the first transparent conductive layer, wherein both the first backing substrate and the first adhesive layer extend above the intermediate layer, wherein only the first adhesive layer extends into the first hole, and wherein the first adhesive layer comprises conductive material;
   a second bus bar extending into a second hole of the intermediate layer and contacting the second transparent conductive layer, wherein each of the first bus bar and the second bus bar extend above the intermediate layer; and
   a substrate, wherein the active stack is between the intermediate layer and the substrate, wherein the intermediate layer has a thickness that is less than a thickness of the substrate, and wherein the intermediate layer has a thickness that is less than 100 nm.

2. The non-light-emitting variable transmission device of claim 1, wherein the second bus bar comprises a second conductive tape, the second conductive tape of the second bus bar extending into the second hole of the intermediate layer and contacting the second transparent conductive layer, wherein the first hole is spaced apart from the second hole.

3. The non-light-emitting variable transmission device of claim 2, wherein at least one of the first hole and the second hole includes a pattern of holes extending through the intermediate layer to the first transparent conductive layer.

4. The non-light-emitting variable transmission device of claim 2, wherein at least one of the first and second bus bars has a backing substrate having a resistivity in a range of 1 µΩ-cm to 7 µΩ-cm.

5. The non-light-emitting variable transmission device of claim 1, wherein the first bus bar does not contact any layer of the active stack or the second transparent conductive layer.

6. The non-light-emitting variable transmission device of claim 1, wherein the first transparent conductive layer has a first thickness at a location under the first hole and a second thickness at another location spaced apart from the first hole, wherein the first thickness is less than the second thickness.

7. The non-light-emitting variable transmission device of claim 6, wherein the first thickness is at least 90% of the thickness of the second thickness.

8. The non-light-emitting variable transmission device of claim 6, wherein a difference between the first thickness and the second thickness is no greater than 2 nm.

9. The non-light-emitting variable transmission device of claim 1, wherein the conductive material does not contain silver.

10. A non-light-emitting variable transmission device, comprising:
   an active stack;
   a first transparent conductive layer overlying the active stack;
   an intermediate layer overlying the first transparent conductive layer and defining a first hole;
   a first bus bar comprising a first backing substrate and a first adhesive layer, wherein the first bus bar extends into the first hole and contacts the first transparent conductive layer, wherein both the first backing substrate and the first adhesive layer extend above the intermediate layer, wherein only the first adhesive layer extends into the first hole, and wherein the first adhesive layer comprises conductive material;
   a second bus bar comprising a second conductive tape, the second conductive tape of the second bus bar extending into a second hole of the intermediate layer and contacting a second transparent conductive layer, wherein the first hole is spaced apart from the second hole; and wherein each of the first bus bar and the second bus bar extend above the intermediate layer; and
   a substrate, wherein the active stack is between the intermediate layer and the substrate, wherein the intermediate layer has a thickness that is less than a thickness of the substrate, and wherein the intermediate layer has a thickness that is less than 100 nm.

11. The non-light-emitting variable transmission device of claim 10, wherein the conductive material does not contain silver.

12. The non-light-emitting variable transmission device of claim 10, wherein the first bus bar does not contact the second transparent conductive layer.

13. The non-light-emitting variable transmission device of claim 10, further comprising a third hole between the first hole and the second hole to electrically isolate the first bus bar.

\* \* \* \* \*